Patented July 30, 1935

2,009,597

UNITED STATES PATENT OFFICE 2,009,597

PLASTER BANDAGE

Harry M. Weber, Newton, Mass.

No Drawing. Application October 12, 1934,
Serial No. 748,112

5 Claims. (Cl. 128—91)

This invention relates to the preparation of plaster of Paris bandages for surgical or other uses and consists in a novel process of preparing non-dusting bandages of this nature.

Two types of bandages containing plaster of Paris have heretofore been used for the application of surgical casts. One in which loose plaster of Paris is spread as evenly as possible on starch or glue sized or unsized gauze and the gauze is then rolled as compactly as possible. The plaster dusts out of such rolls with comparative ease when they are handled. This results not only in the loss of the plaster but is also a source of annoyance, particularly when such plasters are used in the home or a surgeon's office. Furthermore, when wetted prior to application in the usual manner by setting the roll on one end in a body of water, the plaster tends to fall to one end of the roll. This uneven distribution tends to make the even application of the plaster quite difficult. Considerable plaster is also likely to be lost at this point and it is difficult to control such loss.

In the second type, or so-called hard-coated bandages, plaster of Paris is held on the gauze by means of an adhesive or binder. Such a bandage has obvious advantages over the loose plaster type, in that dusting, settling and loss of the plaster is minimized. Furthermore, by tightly winding such bandages in a roll, the quantity of water taken up by the bandage can be to some extent controlled. As is well known, the ultimate strength of a plaster of Paris cast is seriously affected by any excess water used and consequently the addition to the bandage of the correct amount of water is a matter of considerable importance.

The present invention deals with the production of bandages of the second or hard-coated type. Heretofore such bandages have been prepared by coating starch sized or unsized gauze with a paste made up of plaster of Paris, water, a water soluble binder, such as dextrine, and a material that acts as a retarder in the setting of plaster of Paris, such as acetic acid. The coated gauze is then dried at an elevated temperature. Bandages prepared in this manner while of value for surgical purposes, have serious disadvantages. Casts prepared from them are not as strong in the wet state, that is, immediately after the initial set has taken place, as those prepared from an equivalent amount of plaster of Paris used in a loose plaster bandage. One cause of the loss of strength is the difficulty of eliminating all of the acid material used as a retarder in the preparation of the bandage. This leads to the use of excessive amounts of accelerators of the setting of plaster of Paris when equivalent or speedier setting is required. The presence of the acid material also slows the drying of the cast and consequently increases the time for the cast to acquire its maximum strength. This slowing action is particularly noticeable and objectionable on damp or wet days. In some cases it has been found necessary to use a blast of heated air on the cast to accelerate the drying and render the cast of sufficient strength, within a reasonable period of time, to serve the purpose for which it is used.

It is an object of the present invention to produce a bandage free from the foregoing and other objectionable features, of the present day hard-coated bandages. Another object is to reduce the cost of such bandages.

In order that the present invention may be fully understood, a brief description follows of the requirements that a bandage of this nature should fulfill. Of primary importance from both the surgeon's and patient's standpoint is that the time required to apply the bandage be as short as possible. Consequently the plaster should permit a sufficient period of time for the application of the cast and then set and attain strength rapidly while in the wet state, in order that the time that it is necessary to hold a broken limb, for example, in position should not be unduly long. Another requirement is that of high strength while in the wet state as otherwise the cast must be of objectionable bulk to support the broken part. Therefore the desirability of a plaster bandage may be said to be governed by its strength one hour or less after its application, or in the wet state.

The setting time of the plaster may vary depending upon the size of the cast to be applied, the skill of the surgeon making the cast and the technique used.

I have discovered that satisfactory bandages for surgical purposes can be prepared at small cost by applying to a sheet of gauze a paste consisting of gypsum, water and a binder, subsequently drying and dehydrating the coated material, and thus by suitable heat treatment converting it to plaster of Paris. In this manner a hard-coated plaster bandage was obtained with many desirable properties.

It might be supposed that upon raising the temperature of the coated gauze to a point at which the gypsum loses water of crystallization, the steam so generated would destroy the adhesion of the coating to the gauze. The contrary was found to be true, as the coating adheres well and is practically dustless. In addition, the coated gauze may be wound into a tight roll without destroying this desirable characteristic to any appreciable degree.

The obvious advantages of the process are readily apparent in that but one heat treatment of the gypsum is necessary. In addition, local superheating of the gypsum resulting in the formation of anhydrous calcium sulfate, such as occurs in present processes of manufacturing plaster of Paris is largely overcome. Consequently the need of aging or tempering the plaster by standing or by the use of some chemical agent for this purpose during the manufacture is unnecessary. Furthermore, the wetting of a tight rolled bandage before application is found to be facilitated and takes place in a matter of seconds instead of minutes.

Plaster casts made from bandages prepared in the manner above outlined are of greater strength when in the wet state than those prepared in an equivalent manner from loose plaster rolled in gauze or from hard-coated plaster bandages as marketed at present. The increase in strength of my improved bandage is as much as fifty per cent or more. The probable explanation of this greater strength lies in the smaller amount of gypsum converted to the anhydrous salt in the plaster; and also in the well known fact that the dehydration of set plaster of Paris to the hemihydrate results in the production of a material giving a cast of lesser strength when set with water.

The amount of plaster that can be applied to the gauze by this process can be varied within wide limits, such amount ranging from 0.04 grm. to 0.4 grm. per square inch of gauze. Greater amounts may be applied if necessary but present surgical practice requires a bandage containing approximately 0.24 grm. per square inch of gauze. This requirement is determined on a strength-weight basis.

Preferably this proportion of plaster-gauze is used as practice has shown this to be best adapted to the surgeon's needs. That is, greater amounts present some difficulty in application due to lack of gauze foundation to build the cast upon, resulting in the loss of plaster in the greater amount that adheres to the operator's hands. A lesser amount of plaster to gauze results in voids in the cast or uneven filling of the meshes of the gauze with plaster with a consequent loss of strength. By using smaller amounts of plaster there is always the danger of the plaster "leaving", that is, one or more layers of the plaster impregnated gauze separating from those previously applied, resulting in the destruction of the cast.

Aside from the simplicity of manufacture, several advantages present themselves in practice due to the additional strength of the wet cast prepared from bandages made in accordance with the present invention. First, in the additional security of a cast of a given weight when compared with that obtained from present day plasters; second, in the reduction in the length of gauze required in a cast of given strength and, inasmuch as the gauze is the more expensive constituent of the bandage, a resulting reduction in the cost of the cast; third, in a reduction in the time required to apply a cast as this is almost proportional to the length of bandage used and, consequently, a faster setting plaster may be used and the patient at rest in a shorter period of time; and fourth, in the reduction of the weight of the cast necessary for a given purpose.

One method of preparing the plaster of Paris bandage in accordance with the present invention is as follows: 100 parts of native gypsum, preferably containing ninety-two percent or more of calcium sulfate, is finely ground and mixed with 25 to 75 parts of volatile liquid material such as water, alcohol, benzene or the like, containing a small amount, for example 0.1 to 2 parts, of a binding material such as soluble starch, cornstarch, resins, gums, clays and the like, to form a paste. The resulting paste is spread on sized or unsized gauze of suitable mesh by any suitable means and the coated gauze passed into a suitable oven where it is dried and dehydrated, at a temperature up to 130° C.

Preferably the coating, drying and dehydrating of the gypsum is carried out in a continuous manner. That is, gauze of suitable width is passed through a receptacle containing the gypsum paste. Suitable rollers or spreading knives regulate the quantity of paste spread on the gauze. The coated gauze is then draped on racks mounted on a continuously moving chain and passed through an elongated chamber through which air heated to 130° C. is continuously passed in countercurrent to the passage of coated gauze. The speed of passing the gauze through the chamber is so regulated that it has been dried and dehydrated on emerging. It is then cut into desired lengths and rolled in any convenient manner.

As an example of a method of manufacturing the hard-coated plaster gauze or bandage, the following is given, the proportions being in parts by weight. 400 parts of native gypsum containing 92 per cent of calcium sulfate is ground to pass an 80 mesh screen and then mixed with 160 parts of water containing 1 part of soluble starch. The resulting paste is spread evenly on 2 inch surgical gauze, 32 by 28 mesh, by means of a knife. The coated gauze is then wound on a circular rack which is placed in an oven, maintained at a temperature of 130° C. Air is circulated through the oven during the course of drying and dehydrating of the bandage. The bandage remains in the oven until it reaches a temperature of 123–125° C. It is then removed, wound into a compact roll and cooled.

The dehydrated plaster bandage contains three ounces of plaster to five yards of two inch gauze, or 0.24 grm. of plaster per square inch of gauze. The resulting roll of plaster coated gauze is compact, resistant to dusting when handled, and possesses the other advantages above discussed.

A plaster cast was made from this bandage by immersing the roll in a body of water. The roll took up water quickly and there was no evidence of any material loss or movement of the plaster on the gauze. The excess water was removed by lightly squeezing the roll and the bandage wrapped around a cylinder to form a circular cast, in a manner similar to that used in practice by surgeons. The resulting cast set quickly. On testing for strength by collapsing the wet cast by means of pressure, it was found to be stronger than a similar cast made from an equivalent amount of loose commercial plaster of Paris on gauze, commonly used for the purpose. The strength test referred to was carried out twenty minutes after the roll was first immersed in the water.

From a series of strength tests carried out on casts made from coated bandages prepared in the foregoing manner, it has been found that the initial setting of the plaster begins after the lapse of approximately five minutes, or a period similar to that of the commercial plaster. The strength then increases much more rapidly than in the case of the commercial plaster, until at the end of twenty minutes time the strength is approximately 50 per cent greater. At the end of thirty minutes, the cast has attained is maximum strength while in the wet state. The strength then remains constant for approximately twenty-four hours, when it again increases as the cast dries. The latter increase of strength, while desirable, is not important for the present purpose for obvious reasons.

As another specific example of one method of preparing a hard-coated plaster bandage in accordance with the present invention, the following is given: 100 parts of ground native gypsum may be mixed with 40 parts of benzole in which there has been dissolved 1 part of resin. The coating, drying and dehydrating of the plaster may be carried out in a similar manner to that employed in the above example. The coated bandage obtained will be not quite as resistant to dusting as that obtained by the method used in the preceding example but is satisfactory from this standpoint. Upon preparing a cast from the bandage prepared in this manner, the cast compared favorably with a similar cast made from commercial plaster of Paris.

Similar bandages were prepared using alcohol and other liquid materials for the preparation of the paste and using other materials such as resin ester, cumaron resin, cornstarch, etc. as binders, with equally advantageous results in the coated bandages obtained. The slight decrease in the time and heat required to dry the bandages where organic solvents were used was offset by the increased cost of production due to solvent loss. Consequently while such liquid materials may be used for any purpose in which their use is of advantage, such use is still to be considered within the scope of the present invention.

In the preceding examples, unsized gauze was used in the preparation of the hard-coated bandages. Gauze sized with starch, resins and other materials may be used. For example, gauze sized with starch may be used to advantage where organic liquids are used in the preparation of the gypsum paste. With water as the liquid, resin sized gauzes, particularly those sized with cumaron resin, were found to present certain advantages when used without affecting the strength of the casts prepared from them adversely. Gauze sized with resins are to a certain degree water-proofed and do not lose their stiffness to as great a degree when wet with water. Consequently the dehydration of the plaster coated bandage and to some extent the application of the bandage is facilitated. The use of resin sized gauze in bandages of this nature is a further feature of this invention.

In some cases, depending upon the nature and size of the cast to be prepared from the plaster bandage, it is desirable to increase or reduce the setting time of the plaster. To this end any of the well-known retarders, such as glue or blood, or accelerators, such as alum, potassium sulfate, etc., may be used. Such materials may be added to the liquid used to form the paste before mixing it with the native gypsum, as in this manner an equal distribution is best obtained. For example, one part of alum was added to the materials used in making up a bandage, as explained in connection with the first example. A cast prepared from the bandage after dehydration gained its maximum strength more rapidly than a similar cast made from bandage in which the accelerator was not used. No appreciable loss of strength was observed in the cast. The use of such setting time regulators incorporated in plaster bandages in this manner is to be considered a part of the present invention.

Having thus described my invention, what I claim as new and desire to secure by Letters Patent is:

1. In the manufacture of a plaster bandage, the steps of forming a paste of finely ground native gypsum, a liquid and a binding agent, coating gauze therewith and dehydrating the constituents of such coated gauze, to form plaster of Paris in said coating.

2. The process of making plaster bandages which is characterized by the steps of coating a gauze strip with a paste containing native gypsum ground with a binding agent, and then heating the coated strip at a temperature of about 130° C. to form plaster of Paris in the coating.

3. In the manufacture of plaster of Paris bandages, the steps of coating a resin sized gauze with a paste comprising native gypsum, a liquid and a binding agent and subsequently dehydrating the constituents of such coated gauze by heating up to 130° C.

4. The process of making plaster bandages which is characterized by the steps of coating a resin sized gauze with a paste containing native gypsum ground fine with a liquid and a binding agent, and then converting a portion of the coating to plaster of Paris by dehydrating at about 130° C.

5. The process of making plaster of Paris bandages which is characterized by the steps of coating gauze with a paste containing ground native gypsum and a setting time regulating material, and then converting a portion of the coating to plaster of Paris by dehydration.

HARRY M. WEBER.